United States Patent
Berg et al.

(10) Patent No.: US 10,180,118 B2
(45) Date of Patent: Jan. 15, 2019

(54) ELECTRICAL/CHEMICAL THRUSTER USING THE SAME MONOPROPELLANT AND METHOD

(71) Applicant: The Curators of the University of Missouri, Columbia, MO (US)

(72) Inventors: Steven P. Berg, Rolla, MO (US); Joshua L. Rovey, Rolla, MO (US)

(73) Assignee: The Curators of the University of Missouri, Columbia, MO (US)

( * ) Notice: Subject to any disclaimer, the term of this patent is extended or adjusted under 35 U.S.C. 154(b) by 247 days.

(21) Appl. No.: 15/391,430

(22) Filed: Dec. 27, 2016

(65) Prior Publication Data

US 2017/0191471 A1   Jul. 6, 2017

Related U.S. Application Data

(60) Provisional application No. 62/273,613, filed on Dec. 31, 2015.

(51) Int. Cl.
*F02K 9/42* (2006.01)
*F02K 9/52* (2006.01)
(Continued)

(52) U.S. Cl.
CPC .............. *F02K 9/425* (2013.01); *F02K 9/52* (2013.01); *F02K 9/94* (2013.01); *F03H 1/0012* (2013.01)

(58) Field of Classification Search
CPC ... F02K 9/425; F02K 9/52; F02K 9/94; F03H 1/0012; F03H 1/005; B64G 1/405
See application file for complete search history.

(56) References Cited

U.S. PATENT DOCUMENTS

| 2004/0173743 A1 | 9/2004 | Valaskovic et al. |
| 2008/0072565 A1* | 3/2008 | Bekey ................. F03H 1/005 60/203.1 |

(Continued)

FOREIGN PATENT DOCUMENTS

WO   2010036291 A2   4/2010

OTHER PUBLICATIONS

PCT Search Report, PCT US 2016/068893, dated Sep. 1, 2017.
(Continued)

*Primary Examiner* — Gerald L Sung
*Assistant Examiner* — William Breazeal
(74) *Attorney, Agent, or Firm* — Sandberg Phoenix & von Gontard P.C.

(57) ABSTRACT

A thruster operable in a chemical mode or in an electrospray mode using the same liquid monopropellant for operation in both modes is described having a multiplicity of a microthrusters made of a catalytic material having a bore therethrough, where, when operated in the chemical mode, the microthrusters are heated to decompose the monopropellant the monopropellant flows therethrough to generate relatively high thrust. An extractor is positioned downstream of the outlet ends of the microthrusters, such that when the system is operated in its electrospray mode the flowrate of the monopropellant through the microthrusters is substantially lower than in the chemical mode and the extractor is energized with an electric field so that ions and droplets are discharged from the microthrusters and accelerated so as to yield a relatively high specific impulse.

23 Claims, 6 Drawing Sheets

(51) Int. Cl.
  *F03H 1/00*   (2006.01)
  *F02K 9/94*   (2006.01)

(56) References Cited

U.S. PATENT DOCUMENTS

2010/0107601 A1   5/2010   Valentian
2012/0144796 A1   6/2012   Marrese-Reading et al.
2013/0228700 A1   9/2013   Lozano et al.

OTHER PUBLICATIONS

Dr. James M. Haas and Dr. Michael R. Holmes; A Multi-Mode Propulsion System for the Expansion of Small Satellite Capabilities; pp. 5-1 thru 5-8; NATO Unclassified; Edwards AFB, CA 93524, USA.
Anthony Cofer, A. Venkattraman and Alina Alexeenko; Microspike Based Chemical/Electric Thruster Concept for Versatile Nanosat Propulsion; pp. 1-13; 47th AIAA/ASME/SAE/ASEE Joint Propulsion Conference & Exhibit; Jul. 31-Aug. 3, 2011, San Diego, California.
Kento Masuyama and Paulo C. Lozano; Bimodal Propulsion System Using Ionic Liquid Propellant for Pico- and Nano-satellite Applications; pp. 1-9; 49th AIAA/ASME/SAE/ASEE Joint Propulsion Conference; Jul. 14-17, 2013, San Jose, California.
T. Rexius and M. Holmes; Mission Capability Gains from Multi-Mode Propulsion Thrust Profile Variations for a Plane Change Maneuver; pp. 1-13; Air Force Research Laboratory, 4 Draco Dr., Edwards Air Force Base, California 93523.

\* cited by examiner

ELECTRICAL/CHEMICAL THRUSTER USING THE SAME MONOPROPELLANT AND METHOD

CROSS-REFERENCE TO RELATED APPLICATIONS

This is application claims priority to U.S. Provisional Application No. 62/273,613, filed on Dec. 31, 2015, which is herein incorporated by reference in its entirety.

BACKGROUND

This disclosure relates to a multi-mode or dual mode electrical/chemical thruster for use in a propulsion system for a spacecraft where the thruster uses the same liquid monopropellant for operation in both modes. A propulsion system of this disclosure uses one or more of the above-said thrusters, which may be operated in either an electro-spray mode to achieve high specific impulse or in a chemical mode to achieve high thrust.

Most spacecraft propulsion concepts can be classified into two categories: chemical or electrical. Chemical propulsion relies on chemical reactions and can produce high thrust, but requires a relatively large amount of fuel. Electric propulsion uses electromagnetic fields to accelerate ionized gases and droplets. As compared to chemical propulsion, electric or electrospray propulsion is very fuel efficient and produces high specific impulse, but produces smaller amounts of thrust and thus requires long trip times. The propulsion system of the present disclosure relates to a thruster capable of switching between chemical mode and electric mode while utilizing the same propellant. Multiples of these thrusters may be combined to form a reaction control system or a propulsion system for a spacecraft. For propulsion applications in small satellites, minimum propulsion system mass is of utmost importance. The multi-mode propulsion system of the present disclosure makes use of shared propellant and shared hardware for operation in both the chemical and electric electrospray propulsive modes thus minimizing the mass of the propulsion system.

Ionic liquid multimode or dual mode propulsion systems are known, such as disclosed in WO 2010/036291, that employ an ionic liquid monopropellant, but require separate electrospray thrusters and chemical thrusters. The electrospray thrusters of such prior art systems are used for high specific impulse applications and the chemical thrusters are used for high thrust applications.

SUMMARY

Among the several objects and features of this disclosure may be noted the provision of a multimode (e.g., a dual mode) propulsion system having one or more thrusters, each of which thrusters may be switched between an electrospray mode and a chemical mode and which utilize the same monopropellant when operated in both modes;

The provision of such a dual mode propulsion system in which the thrusters have a single propellant supply system thus minimizing the mass of the propulsion system;

The provision of such a dual mode propulsion system that provides enhanced mission flexibility for small satellites and spacecraft;

The provision of such a dual mode propulsion system that allows for significant mission changes on-orbit;

The provision of such a dual mode propulsion system that enables missions not achievable by chemical or electric propulsion alone, or by separate chemical and electric propulsion;

The provision of such a dual mode propulsion system that allows many different types of maneuvers of the spacecraft that are not achievable with a single mode propulsion system;

The provision of such a dual mode propulsion system that uses a non-toxic, green ionic liquid propellant with properties similar to AF-M315E in the chemical mode of operation and similar properties to the ionic liquid [Emim][Tf2N] in the electric mode of operation;

The provision of such a dual mode propulsion system wherein each thruster comprises a plurality of microthrusters or emitters;

The provision of such a dual mode propulsion system wherein thruster size (or output) can be adjusted by simply adding or subtracting emitters (or microthrusters) in the thruster design;

The provision of such a dual mode propulsion system that provides significant flexibility in design thrust level while keeping the same spacecraft interface;

The provision of such a dual mode propulsion system that scales from pico- to micro-satellites;

The provision of such a dual mode propulsion system that may be utilized for attitude control, orbit raising (orbit change) maneuvers, or for trajectory changes of a spacecraft;

The provision of such a dual mode propulsion system that utilizes propellants that are capable of both chemical monopropellant and electric electrospray propulsion;

The provision of such a dual mode propulsion system that achieves rapid thermal and catalytic decomposition wherein solid carbon forms are substantially absent from the exhaust gas after chemical decomposition.

In accord with the present disclosure, an electrical/chemical thruster for a spacecraft is described that is operable in a chemical mode and in an electrospray mode and that utilizes a liquid monopropellant for operation in both of the modes, the thruster having a plurality of microthrusters. Each microthruster comprises a microtube having a bore therethrough and having an inlet end and an outlet end with the inlet ends of the microtubes being in communication with a supply of the monopropellant. Each microtube is of a catalytic metal that is capable of being heated to a preheat temperature sufficient to substantially decompose the monopropellant as the monopropellant flows therethrough at a first flowrate so as to generate relatively high thrust when operated in the chemical mode as compared to when operated in the electrospray mode. The thruster further includes an extractor proximate the outlet ends of the microtubes, whereby when the thruster is operated in its electrospray mode the extractor is energized with an electric field so as the monopropellant flows through the microtubes at a second flowrate substantially less than the first flowrate. Ions and charged droplets discharged from the microtubes are accelerated so as to yield a relatively high specific impulse as compared to operation of the microtube when operated in its chemical mode.

Further accord with the present disclosure, an electrical/chemical propulsion system for a spacecraft is described that has one or more thrusters operable in a chemical mode or in an electrospray mode that utilizes a liquid monopropellant for operation in both of the modes. Each thruster has a plurality of microthrusters. Each microthruster comprises a microtube having a bore therethrough and having an inlet end and an outlet end with the inlet end being in communication with a supply of the monopropellant. The microtube is of a catalytic metal that is capable of being heated to a preheat temperature sufficient to substantially decompose the monopropellant in the microtube as the monopropellant flows therethrough at a first flowrate so as to generate relatively high thrust when operated in its chemical mode as compared to when operated in its electrospray mode. The propulsion system further includes an extractor downstream of the outlet end of the microtube, which extractor, when the thruster is operated in its electrospray mode, is energized with an electric field such that as the monopropellant flows through the microtube at a second flowrate substantially less than the first flowrate. Ions and droplets discharged from the microtube are accelerated so as to yield a relatively high specific impulse as compared to operation of the microtube when operated in its chemical mode.

This disclosure further includes an electrical/chemical spacecraft propulsion method that utilizes a liquid monopropellant comprising one or more fuels and an oxidizer for operation in either an electrospray mode or a chemical mode. The method comprises the steps of spraying the monopropellant from a plurality of capillary emitters in an electric field for generating a relatively high specific impulse as compared when operated in its chemical mode, or preheating the capillary emitters and chemically reacting the monopropellant in the capillary emitters as the monopropellant flows therethrough for generating relatively high thrust as compared when operated in its electrospray mode.

Other objects and features of the present disclosure will be in part apparent to those skilled in the art and will be in part particularly pointed out hereinafter.

DRAWINGS

Corresponding reference characters represent corresponding parts of the present disclosure throughout the several views of the drawings.

DETAILED DESCRIPTION

Figure 1:
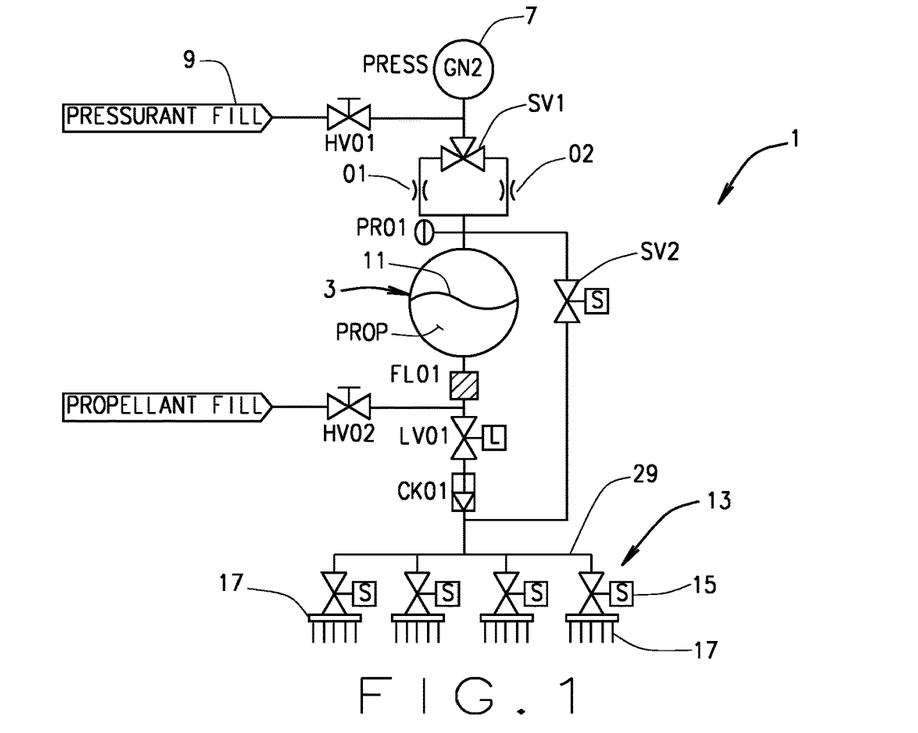
FIG. 1 is schematic of a propulsion system in accord with the present disclosure in which a plurality of dual mode thrusters, each of which thrusters is comprised of a plurality of microthrusters, where such microthrusters are supplied with a liquid monopropellant, and where each of the microthrusters is capable of being switched between an electrospray and a chemical mode so as to generate either a high specific impulse with a lower flow rate of propellant when operated in the electrospray mode or so as to generate a higher thrust using a higher propellant flow rate when operated in the chemical mode, where the same monopropellant is used in both modes.
Figure 2:
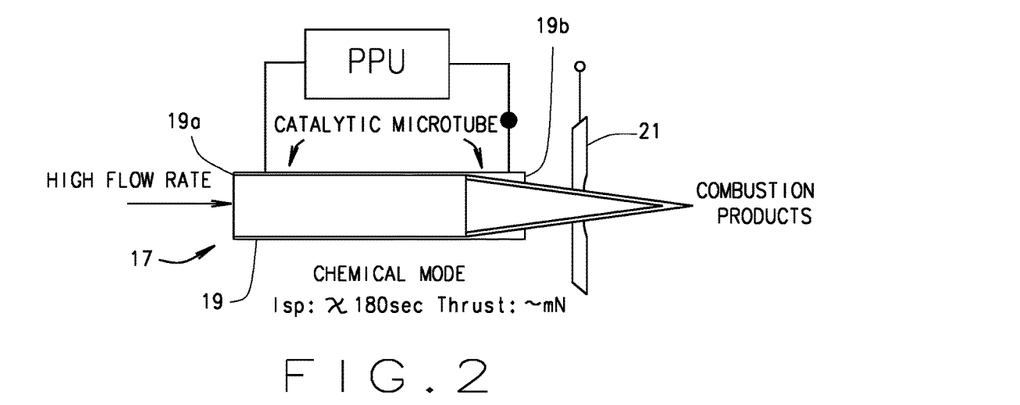
FIG. 2 is a schematic representation of a dual mode microthruster or emitter of the present disclosure, such as may be used in the propulsion system of FIG. 1, in which the microthruster is a catalytic emitter or microtube into which a relatively high flow rate of propellant is delivered, where a power processing unit (PPU) is connected across the microtube such that the tube may be heated to a preheat temperature sufficient for the microtube to be operated in a chemical mode so as to generate relatively high thrust.
Figure 3:
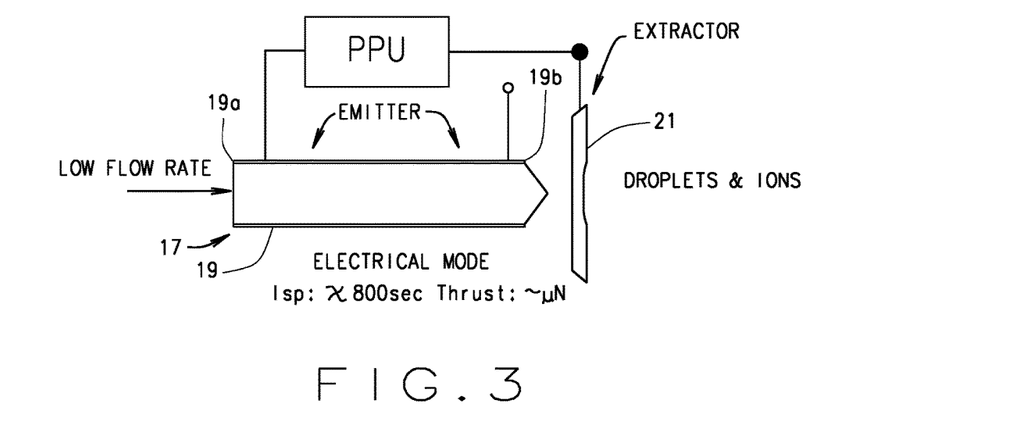
FIG. 3 is another view of the microthruster shown in FIG. 2 in which a much lower flow rate of propellant is delivered to the microthruster and in which the PPU energizes an extractor grid with an electric field such that the thruster may be operated in an electrospray mode to generate a relatively high specific impulse while having an appreciably lower flow rate of propellant therethrough than when operated in the chemical mode.

Referring now to the drawings, and more particularly to FIGS. 1-3, a monopropellant, dual mode (e.g., chemical/electrical) propulsion system of the present disclosure is indicated at 1. This propulsion system has a propellant tank 3 containing a supply of a suitable monopropellant 5, as will be described below. The propellant 5 in tank 3 is pressurized with an inert gas, such as nitrogen, contained in a gas tank 7 and supplied from a source or tank 9. Those skilled in the art will recognize that tank 9 is used to supply the pressurant gas to tank 7 prior to launch of a spacecraft and would not be necessary for a flight propulsion system. A flexible bladder 11 is provided within propellant tank 3 to separate the pressurization gas within the tank from the liquid propellant so that the propellant may be reliably dispensed from tank 3 under pressure in the weightlessness of space. While not shown in the drawings, those skilled in the art will understand that tank 3 may be in the form of a cylinder with a piston disposed in the tank to contain the liquid propellant with the pressurization gas pressure acting on the piston to dispense the liquid propellant from the tank in a weightless environment.

As shown in FIG. 1, propellant 5 from tank 3 is supplied under pressure to one or more dual mode thrusters 13 of the present disclosure. Each of the thrusters 13 is controlled by a thruster solenoid valve 15 such that upon opening the valve and upon energizing the thruster (as will be hereinafter described), the thruster will operate in either its chemical or electrospray mode of operation. It will be understood that the thrusters 13 may be controlled by an attitude control system or an orbital maneuvering system of a spacecraft to maintain or achieve a desired attitude or maneuver of the spacecraft in a manner well understood by those skilled in the art and thus will not be described herein. The propulsion system 1 further includes various solenoid valves, check valves and other components that will be understood by one of ordinary skill in the art, but that need not be described in detail herein. The components comprising propulsion system 1 are exemplary and those skilled in the art will recognize that other components and arrangements for the propulsion system can be utilized in accord with the present disclosure. As will be further understood by those skilled in the art, the thrusters 13 may be arranged on a spacecraft or satellite so as to provide attitude control of the spacecraft in pitch, yaw and/or roll, and/or to effect orbital maneuvering of a satellite or to effect trajectory changes of a spacecraft.

Figure 4:
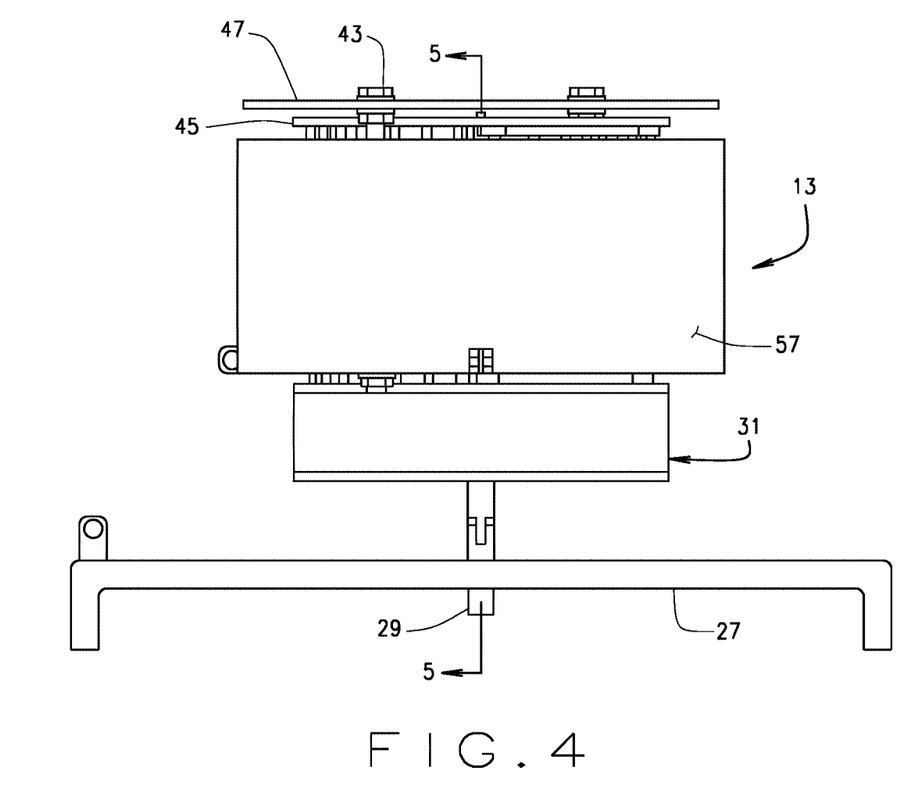
FIG. 4 is a side elevational view of a dual mode thruster of the present disclosure used in the propulsion system of FIG. 1, where the thruster comprises a plurality of microthrusters or emitters, such as shown in FIGS. 2 and 3.
Figure 5:
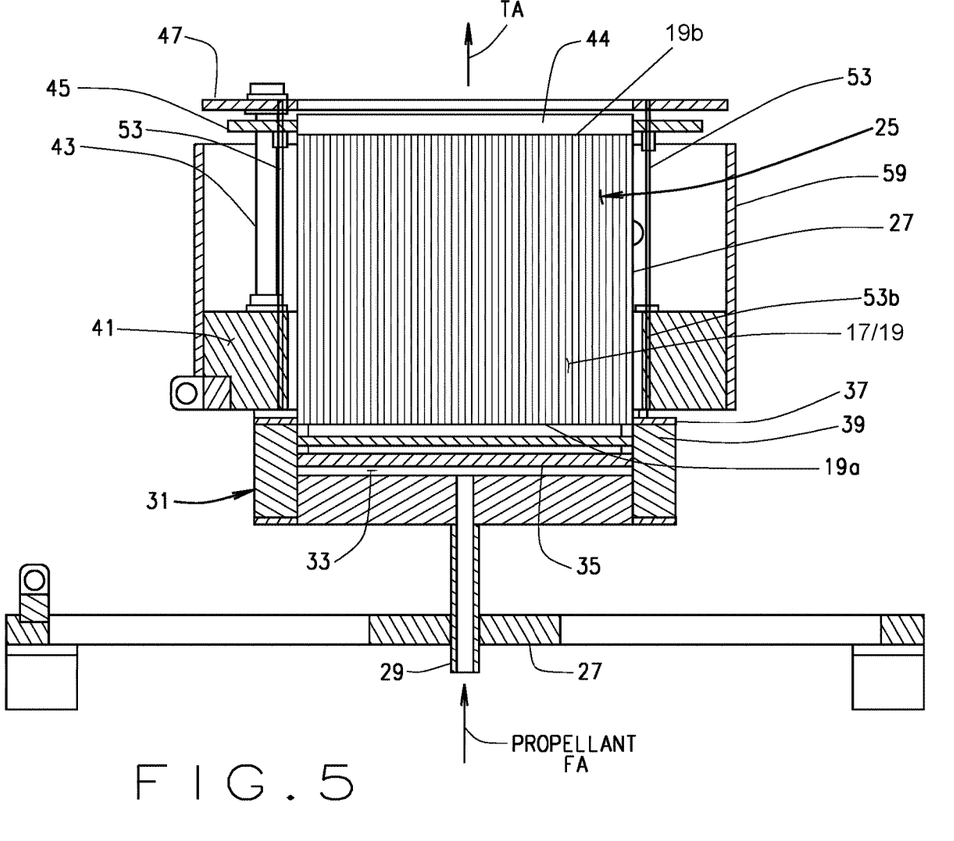
FIG. 5 is a cross-sectional view of the thruster shown in FIG. 4 taken along line 5-5 of FIG. 4 illustrating a cluster of microthrusters having a supply of a suitable monopropellant delivered to a propellant manifold that, in turn, supplies propellant to the inlet ends of the microthrusters or microtubes at such flow rates that the microtubes can be operated in either their chemical or electrospray modes of operation.

As further shown in FIG. 1, each of the thrusters 13 is comprised of a plurality, or more accurately a multiplicity, of microthrusters or emitters 17 of the present disclosure. Even more specifically, 1000s or even 10,000 or more of the microthrusters 17 may be incorporated in a thruster 13, as will be described below and as shown in FIGS. 4 and 5. As used in this disclosure, the term "plurality" has its ordinary meaning of "greater than one" or "two or more", but it also means "a large number".

As shown in FIGS. 2 and 3, each microthruster 17 may be switched between a chemical mode and an electric mode, depending on the satellite or spacecraft maneuver to be executed utilizing the same monopropellant for both modes. Each microthruster 17 comprises a microtube 19 of a suitable catalytic metal that is electrically connected to the power processing unit PPU such that the microthruster may be switched between a chemical mode (as shown in FIG. 2) and an electrospray mode (as shown in FIG. 3). The power processing unit PPU must provide a sufficiently high voltage (e.g., about 3400 V, plus or minus 50% depending on the propellant electrochemical properties and extractor and emitter dimensions) capable of energizing an extractor 21, as shown in FIG. 3, so that the thruster 13 will operate in its electrospray mode. In addition, the PPU must provide sufficient power so as to electrically resistance heat microtube 19 to a desired preheat temperature, as described below, when the thruster is operated in its chemical mode. It will be understood that the electrical power system of a spacecraft or satellite may be the source of power for the PPU.

Each microtube 19 has an inlet end 19a and an outlet end 19b. A suitable monopropellant is supplied under pressure from a source, such as from tank 3, to the inlet end 19a of the microtube so that the propellant will flow through the microtube at a desired flow rate, which will vary depending on whether the microthruster is to be operated in its chemical mode or electrical (e.g., an electrospray) mode. Each microtube 19 preferably has a very small internal diameter of about 100 μm (micro-meters), plus or minus about 50 μm, and has a length of about 30 mm, plus or minus about 10 mm. It is believed that internal diameter of the microtube 19 of such a microthruster 17 could be scaled from the micron scale to about 1 mm, but the preferred scaling is in the above-stated range. Microtube 19 is preferably made of a suitable catalytic metal, such as platinum, rhenium, rhodium, or iridium, so that when the microthruster is preheated and operated in its chemical mode the monopropellant will chemically react within microtube 19 and the combustion products will be discharged from the outlet end 19b of the microtube to provide relatively high thrust, as compared to when the microthruster is operated in its electrospray mode. To achieve chemical decomposition of the propellant, the microtube is electrically resistance heated (or otherwise heated) by the PPU to a preferred preheat temperature of about 300° C., plus or minus about 50° C., and a first propellant flow rate is established through the microtube sufficient to convert substantially all solid carbon forms to either carbon monoxide (CO) or to carbon dioxide (CO2). Those skilled in the art will appreciate that the temperature to which the microtube is preheated could be much higher or somewhat lower depending on the specific propellant choice, catalyst material, and desired flow rate, but the above is presently preferred.

The multi-mode chemical-electric microthruster propulsion system of the present disclosure uses a suitable liquid monopropellant, such as an energetic ionic liquid propellant. A preferred monopropellant is a mixture of ionic liquids, such as 1-ethyl-3-methylimidazolium ethyl sulfate ([Emim][EtSO4]) fuel mixed with hydroxylammonium nitrate (HAN) oxidizer. This is a non-toxic 'green' monopropellant with properties similar to AF-M315E and LMP-103S.

Those skilled in the propulsion art will recognize that there are many other such liquid monopropellants, some of which will be described below, that may be used with the microthrusters 17 of the present disclosure such that the microthrusters may be switched between a chemical and electric propulsion mode. Such other monopropellants, include, but are not be limited to: 1-ethyl-3-methylimidazolium ethyl sulfate ([Emim][EtSO4]), 1-butyl-3-methylimidazolium nitrate ([Bmim][NO3]), Hydroxyethylhydrazinium nitrate (HEHN), or similar derivatives of these ionic liquids, for example, 1-ethyl-3-methylimidazolium nitrate ([Emim][NO3]). Usable oxidizers include, but are not limited to: Hydroxylammonium nitrate (HAN), ammonium dinitramide (ADN), Ammonium nitrate (AN), Hydrazinium nitroformate (HNF). One or more stabilizers that are not strictly ionic liquids or ionic compounds, such as 5-amino-tetrazole may be used in conjunction with these monopropellants.

Other characteristics or properties of preferred monopropellants that may be used in conjunction with the dual mode thrusters of the present disclosure include propellants that preferably have the following characteristics:

Be an ionic liquid or mixture of ionic liquids and other components that has negligible vapor pressure, meaning the liquid or any component in the mixture does not boil when exposed to vacuum at a sufficient rate to affect the electrospray beam or feed rate stability adversely. The preferred propellant, [Emim][EtSO$_4$]-HAN, includes only those two ionic liquids and does not boil when exposed to high vacuum.

Have an oxidizer-to-fuel ratio sufficient to convert all solid carbon forms to CO or CO$_2$ in the exhaust. The preferred propellant is 59% oxidizer and 41% fuel by mass, where [Emim][EtSO$_4$] is the fuel and HAN is the oxidizer. The reverse, 41% oxidizer and 59% fuel by mass, is sufficient by this criteria, but the higher oxidizer content was selected to provide higher chemical performance.

All components of the mixture should be chemically compatible and miscible in each other In addition to the above characteristics, a preferred monopropellant that may be used with the dual mode microthrusters of the present disclosure preferably should have certain additional properties that include:

High electrical conductivity and surface tension. The higher each of these properties are the better for the system overall because it reduces electrospray power requirements.

Have a theoretical chemical mode vacuum specific impulse of at least 250 seconds.

Have high density, preferably at least about 1.4 g/cc, or more.

When operated in its chemical mode, each microthruster 17 is supplied with a relatively high flow rate (e.g., ranging between about 5-40 μL/second/microtube) of monopropellant 5, which is supplied under pressure of the pressurized inert gas supplied from tank 7 that acts against the bladder 11 in fuel tank 3 and that supplies propellant to the inlet ends 19a of microtubes 19 of each of the microthrusters 17 of each thruster 13 at a mass flow rate of about 20 μL/second/ microtube (plus or minus 10 μL/second). The PPU is operated to electrically resistance heat the microtubes 19 to the above-described preheat temperature so as to result in chemical decomposition (combustion) of the monopropellant as the monopropellant flows through the microtubes. When operated in its chemical mode, a microthruster 14 having an internal diameter of about 100 μm (micro meters) will generate a thrust of about 50 μN (micro Newtons), plus or minus about 40% depending on the propellant flow rate through the microthruster, and have a specific impulse Isp of about 180 seconds, plus or minus about 40%, depending on the propellant exhaust species and temperature. However, those skilled in the art that the thrust is related to the flowrate of the propellant and thus varies with the flowrate through the microthruster.

Further in accord with the present disclosure, as shown in FIG. 3, each of the microthrusters 17 of thruster 13 may also be operated in an electric (electrospray) mode to provide a high specific impulse while using appreciably less fuel than when operated in its chemical mode. When the microthrusters 17 of a thruster 13 are operated in their electrospray mode, the flow rate of the propellant supplied to the inlet 19a of each microtube 19 is reduced to about 1 pL (pico liter—1/1,000,000,000,000th of a liter)/second/microtube (plus or minus 0.9 pL/second/microtube) and the PPU is switched to energize the microtube 19 to be an emitter and to generate an electric field via an extractor 21 surrounding the spray of ions and droplets discharged or ejected from the outlet end 19b microtube 19 such that the microthrusters will generate a relatively high specific impulse Isp of about 800 seconds, as compared to operation of the microthruster in its chemical mode.

As further shown in FIG. 1, the flow rate of monopropellant can be selectively controlled for operating thrusters 13 in either their chemical or electrospray modes by switching a three-way solenoid valve SV1 so as to initiate the flow of the pressurant gas from tank 7 into propellant tank 3 through a low resistance orifice O1 to supply monopropellant at a relatively high flowrate to the microthrusters 17 so that the microthrusters 17 will operate in their chemical mode. Alternatively, valve SV1 may be operated so as to initiate the flow of the pressurant gas through a high resistance orifice O2 to supply monopropellant at a relatively low flow rate for operation of the microthruster in its electric mode. Of course, the valve SV1 has a third position that blocks the flow of pressurant gas into propellant tank 3 to thus stop the flow of the monopropellant. As shown in FIG. 1, orifices O1 and O2 are on the gas side of the propellant tank 3 so that they regulate the flow of the pressurant gas into the propellant tank. Those skilled in the art will recognize that, in order to switch from chemical mode to electric mode, pressure on the pressurant gas side of the propellant tank 3 may have to be released through a bypass valve SV2 so as to clear the manifold of unburnt propellant and to better facilitate the shutdown of thruster 13 before or after a chemical mode burn. This may be required if the hydraulic impedance is low enough for low pressure propellant to leak from the manifold into the microtubes. However, this will result in a loss of pressurant gas between thruster burns. In a more preferred, and closer to traditional variation (not illustrated), the solenoid valve SV1 and the orifices O1, O2 may be on the liquid side of the propulsion system 1 (i.e., downstream from propellant tank 3). This architecture, however, will require a control valve between the pressurant tank and propellant tank so that the tank pressure and thus flow can be precisely controlled for the electrospray mode.

Those skilled in the art will also recognize still other ways to modulate or change the flow rate of the monopropellant to the microthrusters 17 when operated in either their chemical or electrospray modes would be to use a piezo actuated valve or other valve that has a variable and controllable orifice diameter.

Figure 1A:
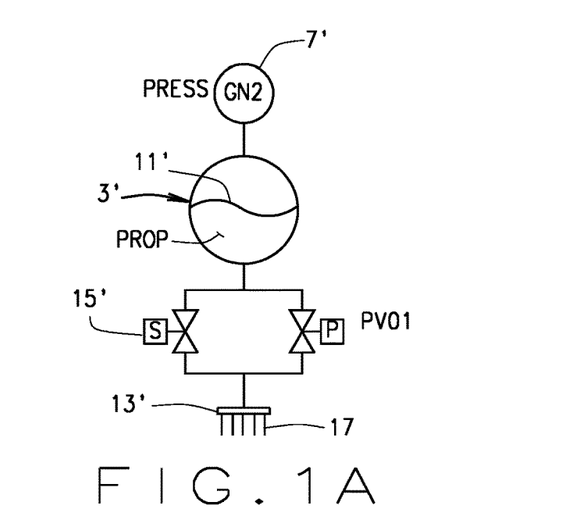
FIG. 1A is a schematic of another propulsion system utilizing a dual mode thruster, such as shown in FIG. 1, where the flow of propellant to the thruster is controlled or modulated by a piezo actuated control valve.

Referring now to FIG. 1A, another propulsion system architecture 1' is shown in which a suitable monopropellant from tank 3' is supplied to a solenoid valve 15' and a piezo control valve PV01 that are arranged in parallel to supply propellant to a thruster 13'. Valve 15' may be actuated to initiate the flow of monopropellant through the thruster 13' at a relatively high flowrate so as to operate in the chemical mode. Alternatively, piezo control valve PV01 may be actuated to initiate the flow of monopropellant through the thruster 13' at a lower flowrate so as to operate in the electrospray mode. Such piezo control valves are commercially available from Morotta Controls, Inc. at: http://marotta.com/piezo-actuated-valves/.

The system of FIG. 1A can be operated in a blowdown mode such that the propellant tank pressure continuously decreases as propellant is expelled. The adjustment to keep flow rates within acceptable tolerances in the electrospray mode is then made by the piezo control valve PV01 as feed pressure is lowered. High flow for the chemical mode operation is then accomplished by opening a solenoid valve 15' which is in parallel with the piezo valve PVC. It is not known at this time if a single piezo valve could be used in place of the parallel configuration of valve 15' and the piezo valve PV01 for achieving both high flow for chemical mode and low for electrospray mode, though this would represent a preferred propulsion system architecture with the minimum components and minimum mass. Those skilled in the art will also appreciate that the feed system architecture shown in FIGS. 1 and 1A are simplified to the point where they are used only to illustrate deviances from 'traditional' spacecraft liquid propulsion systems required to accommodate both modes of the thruster. For example, flight systems will include other well-known components, such as filters, isolation/latch valves, service valves, pressure transducers, and other diagnostic, redundant, or risk-reducing components, that are standard and known practices in spacecraft propulsion systems.

Figure 6:
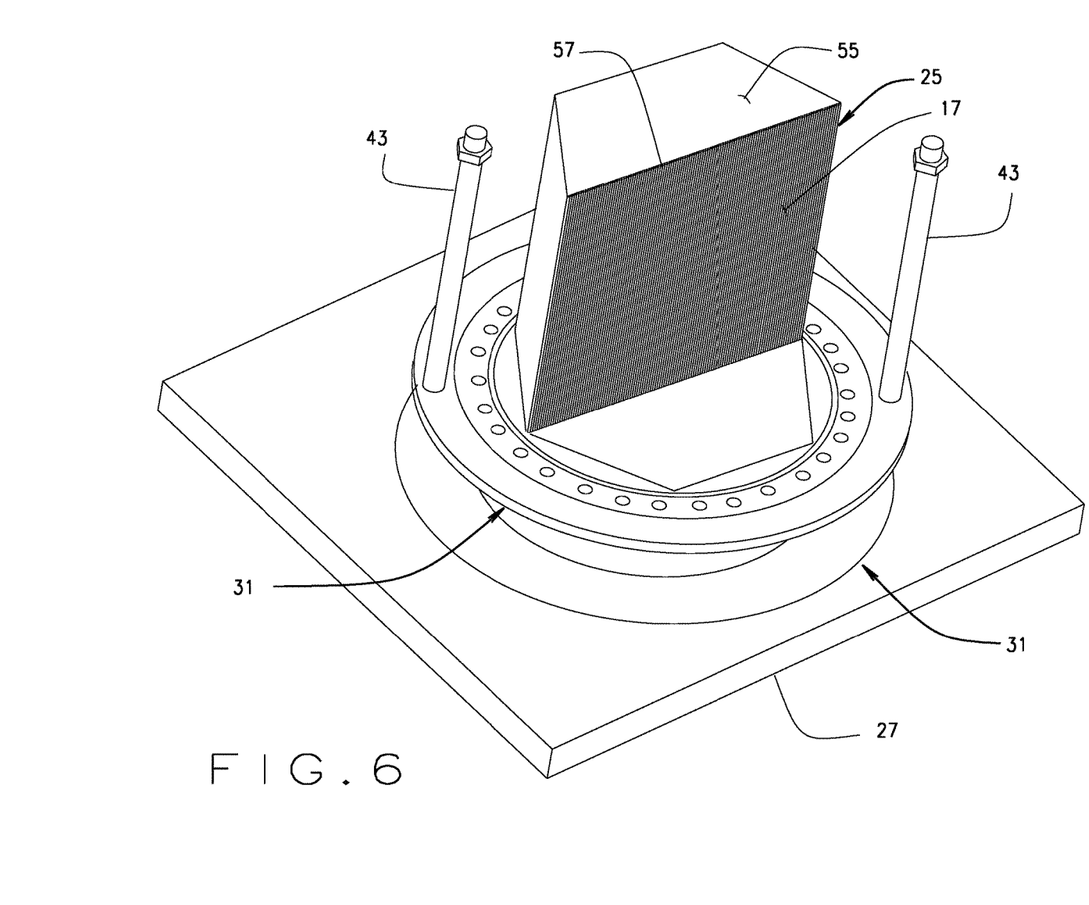
FIG. 6 is an isometric view of the thruster shown in FIGS. 4 and 5 on a somewhat smaller scale with parts broken away or removed illustrating a housing surrounding the cluster of microthrusters, where the cluster of microthrusters is shown in cross section and illustrates one row of microthrusters included in the cluster of microthrusters.

Referring to FIGS. 4-6, thruster 13 is shown to have a cluster 25 of microthrusters 17, where cluster 25 has a plurality, and more preferably, a multiplicity of (e.g., 1000s or even 10,000 or more) microthrusters 17. As best shown in FIG. 5, thruster 13 has a base 27 which may be mounted to a spacecraft such that the thrust of the thruster, acting along its thrust axis TA, may be reacted into the structure of the spacecraft such that upon actuating the thruster, the spacecraft will perform a desired maneuver. Structural links or the like (not shown) couple thruster 13 to base 27 and to the spacecraft and may be utilized to align the thrust axis with a desired line of thrust for the thruster. Propellant for thruster 13 is supplied from a source, e.g., from propellant tank 3 as shown in FIG. 1, by means of propellant inlet or line 29 and the flow of propellant to a thruster 13 is controlled by a respective solenoid valve 15, as shown in FIG. 1. A propellant manifold, as indicated at 31, is supplied with and is preferably substantially filled with liquid monopropellant from line 29. The manifold has a manifold chamber 33 therein that is normally filled with liquid propellant during thruster operation. Baffles 35 are provided in manifold chamber 33 to uniformly distribute propellant to the inlet ends 19a of all of the microthrusters 17 in cluster 25 and to insure an acceptably uniform flowrate of monopropellant to all of the microthrusters. It will be further appreciated by those skilled in the art that in event some portion of the multiplicity of microthrusters 17 is not supplied properly with monopropellant to operate in their chemical or electrospray mode or if some portion of the microthrusters in cluster fail to operate, because there are so many of such microthrusters in cluster 25, the overall performance of thruster 13 will not be substantially adversely affected, thus increasing the reliability of thruster 13.

The proximate or inlet ends 19a of microtubes 19 of cluster 25 are sealably secured to a ring 37 preferably made of platinum or other suitable material that can be reliably welded, soldered, or otherwise sealably bonded to the proximal or inlet ends of microtubes 19 and to seal the gaps between the microtubes without blocking the bores of the microtubes. The ring 37 is sealably secured to manifold 31 by means of O-ring seals 39 or the like so as to seal propellant chamber 33 in manifold 31 relative to the proximal end of cluster 25. In addition, the inlet ends of the microtubes are sealed relative to one another. Those skilled in the art will recognize that there are other processes, such as sintering, diffusion bonding, or 3D printing techniques that may be employed to seal the proximal ends of the microthrusters to one another and to ring 37.

A heat sink 41 surrounds the proximal or lower portion of cluster 25. The heat sink is in heat transfer relation with a housing 55 (as shown in FIG. 6) that fills the space between the housing in the heat sink to prevent the propellant in the microthrusters from prematurely decomposing in the manifold and thus generating gas at higher rate than the thruster structure allows. Emitter bias rods 43 extend upwardly from heat sink 41 (as shown in FIG. 5) on the outside of microthruster cluster 25 to support an emitter guide plate 45 and an extractor grid 47 proximate the outlet or distal ends 19b of microthrusters 17. It will be understood that guide plate 45 and grid 47 have a multiplicity of small diameter holes therethrough, each of which is in axial alignment with the bore of a respective microthruster 17 so that gases or droplets expelled from each microthruster, whether operated in its electrospray or chemical mode, can be effectively discharged without undesirable interference from the guide plate or the grid. At the distal ends of bias rods 43, an electrical insulative washer and nut assembly 49 secure the distal ends of the bias rods to an insulative ceramic insert 51 that forms a part of extractor grid 47. As shown in FIGS. 4 and 6, there are preferably two of such bias rods 43. As indicated at 44 in FIG. 5, proximate the outlet ends 19b of each of the microthrusters 17 in cluster 25, the microtubes taper inwardly taper toward the bores of the microtubes so as to help keep liquid from pooling between emitters or microtubes 19, but may not be necessary depending on the tube OD to ID ratio or could also be accomplished by spacing the tubes such that each tube does not contact another tube at the outlet.

Extractor bias rods 53 are provided to electrically connect extractor grid 47 to a source of electrical voltage. When thruster 13 is operated in the electric mode, power is supplied to extractor bias rod 53 and to create a potential difference between the extractor grid and the tube cluster 25. Electrospray is initiated when propellant reaches the end of the microtubes 17 and the droplets and ions are discharged, as shown in FIG. 3. The tube cluster 25 could also be biased through emitter bias rod 43, but may not be required. When thruster 13 is operated in its chemical mode, rod 43 and another electrical connection point (not shown) at the top of the housing plates is energized so as to resistively preheat microtubes 19 of microthrusters in cluster 25 to a preheat temperature sufficient to result in chemical decomposition of the monopropellant to gaseous products as the propellant flows through the microtubes of the cluster. Alternatively, a catalyst heater (not shown) could wrap around the housing 55, as is typical of conventional monopropellant chemical thrusters. A radiation 57 shield preferably surrounds the thruster to protect components of the spacecraft from overheating caused by the high temperature operation of the thruster in the chemical mode.

As shown in FIG. 6, a housing 55 surrounds and encloses cluster 25. As shown, housing 55 is shown to be of hexagonal cross section. As further illustrated in FIG. 6, one row 57 of microthrusters 17 within cluster 25 is shown. It will be appreciated that many of such rows may be incorporated in the cluster and the cluster need not be of a hexagonal cross section. As shown in FIGS. 5 and 6, radiation shield 59 surrounds housing 55 and the microthruster cluster 25 so as to absorb at least some of the radiative heat given off from cluster 25 when the microthrusters 17 are operated in their chemical mode to protect other components that otherwise would have been exposed to such radiative heat. While this shield 59 may extend the allowable operating time of the thruster in its chemical mode, depending on the design of the spacecraft and the components in proximity to the thruster, it may not be necessary.

As noted, a preferred monopropellant is [Emim][EtSO4]-HAN that may be electrosprayed from the microtube 19 in a manner that it produces a stable electrospray emission in both cation and anion extraction modes at a nominal or preferred extraction voltage of about 3400 V applied to extractor 21 or 47. Near field measurements of current and mass flow rate distribution have been measured at flow rates from 0.19 µL/s to 3.06 µL/s. Total emission current was determined to be in the range of about 754 µA to about 3195 µA for cation emission and from about 552 µA to about 2012 µA for anion emission. The thrust and specific impulse at 0.19 µL/s flow rate were measured to be about 1.08 µN and 412 seconds, respectively, with a beam power of 2.22 µW. At a flow rate of about 3.06 µL/s, the thrust F was determined to be about 8.71 µN and the specific impulse Isp was determined to be about 204 seconds with a beam power of 8.85 µW, where -beam power is the power consumed by the thruster, less parasitic losses in the wiring between the power supply and the thruster. Extrapolation of the current and mass flow rate data shows that specific impulse in excess of about 1000 seconds is achievable through optimized feed system and emitter design.

For successful operation of the thruster 13 in the chemical mode, the propellant flow rate and microtube preheat temperature must be considered. A flow rate that is too high relative to the microtube preheat temperature will not result in ignition of the monopropellant. Conversely, a flow rate that is too low will result in a decomposition reaction that could propagate back into the unheated liquid and potentially back into the propellant manifold 31. Other considerations include the pressure in the microtubes 19 and the preheat temperature of the microtubes. The decomposing monopropellant will generate gaseous combustion products, and, if the flow rate is too high, it may burst the microtube. Lower thruster preheat temperatures are more desirable from a concept of operations standpoint. These considerations define a so-called 'startbox' for the thruster, as illustrated in FIG. 7, which is the set of all flow rates and preheat temperatures required to operate the thruster.

A minimum flow rate, or 'burnback limit', has been established, based on empirical data from strand burner experiments. Given the linear burn rate of the propellant as a function pressure, the minimum flow rate required to prevent the monopropellant from burning back into manifold 31 can be calculated and is a function of the tube inner diameter. The maximum flow rate that does not cause overpressure of the tube is calculated through chemical equilibrium calculations and by assuming the flow of gaseous products is frictionally choked in the microtube 19. The lower preheat temperature limit is calculated by using an experimentally determined reaction rate and the thermal conductivity properties of the propellant in a plug flow reactor model to determine the tube temperature required to ignite the monopropellant before reaching the end of the microtube 19. Finally, the upper preheat temperature limit is a spacecraft operational consideration rather than a physical upper limit. It is desirable to operate at as low of a preheat temperature as possible to reduce the time and/or power required to warm up the thruster.

Figure 7:
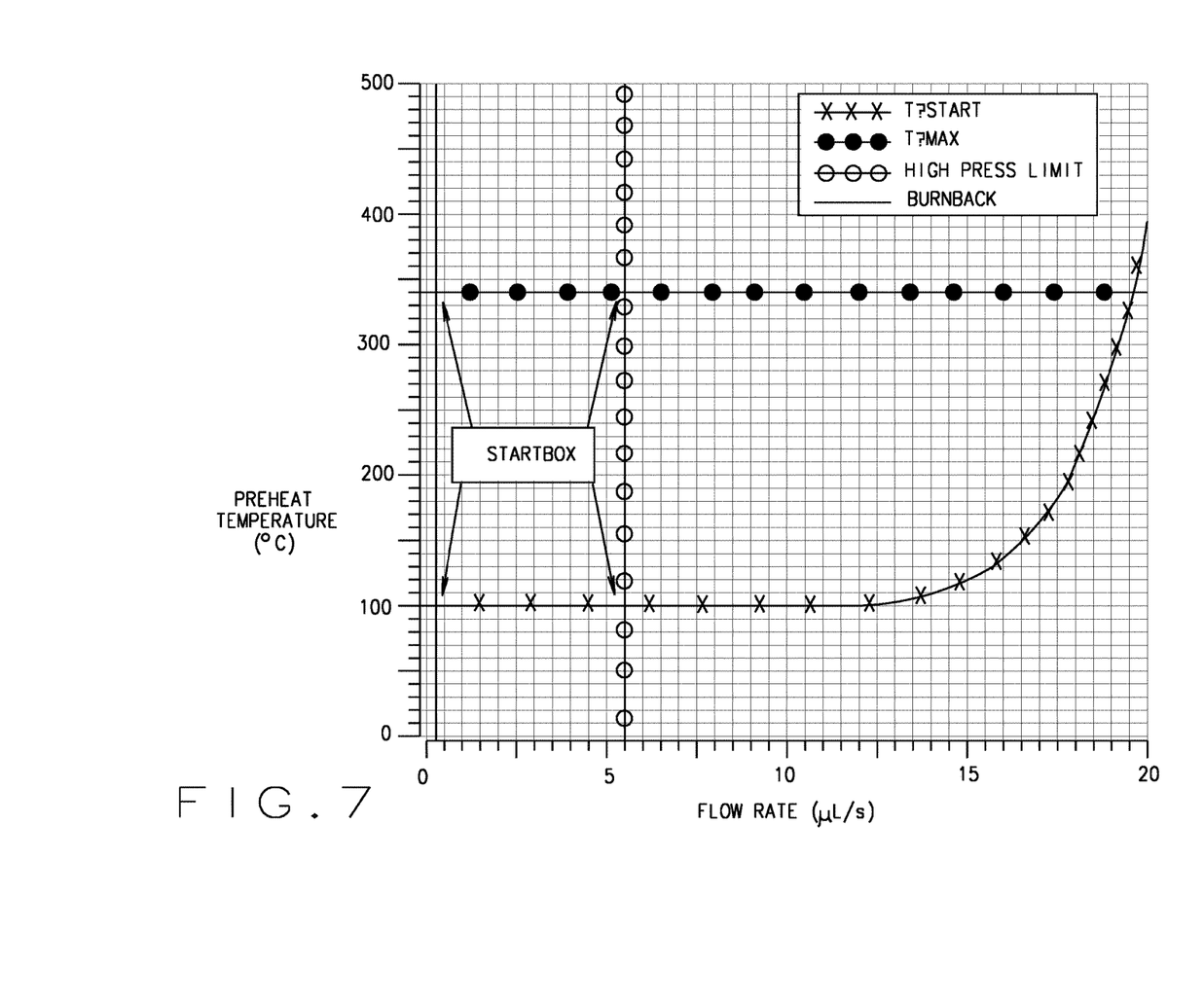
FIG. 7 illustrates graphs of propellant flowrates through a thruster of the present disclosure vs. preheat temperature to define a "startbox" for the thruster.

FIG. 7 shows one example a startbox calculation for platinum microtubes 19 having a 70 µm inner diameter, and a 30 mm length, using [Emim][EtSO4]/HAN monopropellant. The burnback limit was determined from previous linear burn rate experiments. The high flow limit was calculated using the CEA program for the exhaust gas properties and assuming choked flow. The pressure limit in this case was selected to be 200 psia, and is a design choice to lessen requirements on feed system pressure rather than the strength limit of the tube. The lower preheat temperature limit was calculated using a plug flow reactor model with constant wall temperature and single step Arrhenius reaction rate determined empirically from previous experiments. The upper preheat temperature limit is simply selected as 340° C., which is a typical preheat temperature for ionic liquid monopropellant thrusters. In order to operate the thruster, flow conditions in all of the tubes in the array cluster must fall within a box bounded by these curves, as shown in FIG. 7. Obviously, the models used to calculate these curves can be increased in fidelity or further refined. The startbox could also be found through experimental verification or simply trial and error. Those skilled in the art will also recognize that other such startboxes can be determined for microtubes having different internal diameters and lengths.

As various changes could be made to the above constructions and embodiments without departing from the broad scope of this disclosure, it is intended that all matter contained in the above description or shown in the accompanying drawings be interpreted in as illustrative and not in a limiting sense.

What is claimed is:

1. An electrical/chemical thruster for a spacecraft operable in a chemical mode and in an electrospray mode that utilizes a liquid monopropellant for operation in both of said chemical mode and said electrospray mode, said electrical/chemical thruster having a plurality of microthrusters, each microthruster of said plurality of microthrusters comprising a microtube having a bore therethrough and having an inlet end and an outlet end with each inlet end being in communication with a supply of said liquid monopropellant, each microtube comprising a catalytic material capable of being heated to a preheat temperature sufficient to decompose said liquid monopropellant as said liquid monopropellant flows therethrough at a first flowrate so as to generate relatively high thrust when operated in said chemical mode as compared to when operated in said electrospray mode, and wherein said electrical/chemical thruster further includes an extractor proximate each outlet end, whereby when said electrical/chemical thruster is operated in said electrospray mode with said extractor being energized to produce an electric field so that as said liquid monopropellant flows through each microtube at a second flowrate less than said first flowrate, ions and charged droplets discharged from each microtube are accelerated so as to yield a relatively high specific impulse as compared to operation of each microtube when operated in the chemical mode.

2. The electrical/chemical thruster as set forth in claim 1 wherein said liquid monopropellant comprises a mixture of one or more nonvolatile fuels and an oxidizer, wherein at least one of said one or more nonvolatile fuels and the oxidizer is an ionic liquid.

3. The electrical/chemical thruster as set forth in claim 2 wherein said liquid monopropellant has a fuel/oxidizer mixture ratio such that solid carbon forms are oxidized after chemical decomposition.

4. The electrical/chemical thruster as set forth in claim 2 wherein said liquid monopropellant comprises [Bmim][NO$_3$] and hydroxyl ammonium nitrate (HAN).

5. The electrical/chemical thruster as set forth in claim 2 wherein said liquid monopropellant comprises [Emim][EtSO$_4$] and hydroxyl ammonium nitrate (HAN).

6. The electrical/chemical thruster as set forth in claim 3 wherein each microtube is a capillary emitter having an inner diameter of 100 $\mu$m, plus or minus 50%, and having a length of 30 mm., plus or minus 50%.

7. The electrical/chemical thruster as set forth in claim 6 wherein catalytic material is a catalytic metal.

8. The electrical/chemical thruster as set forth in claim 7 wherein each microtube, when operated in the chemical mode, is heated to said preheat temperature by an electric current.

9. The electrical/chemical thruster as set forth in claim 8 wherein said preheat temperature is 300.degree. C., plus or minus 50.degree. C.

10. The electrical/chemical thruster as set forth in claim 8, wherein said first flowrate when each microtube is operated in the chemical mode is 20 $\mu$L/second/microtube, plus or minus 10 $\mu$L/sec/microtube such that each microtube will generate a thrust of 50 $\mu$N, plus or minus 50%.

11. The electrical/chemical thruster as set forth in claim 8, wherein said second flowrate when said microtube is operated in the electrospray mode is 3 pL/second/microtube, plus or minus 1 pL/second/microtube, and wherein when so operated in the electrospray mode each said microtube generates a specific impulse of 800 seconds, plus or minus 90%.

12. The electrical/chemical thruster as set forth in claim 7 further comprising additional microthrusters.

13. The electrical/chemical thruster as set forth in claim 1 wherein said electrical/chemical thruster is supplied with said liquid monopropellant from a monopropellant tank, and wherein said electrical/chemical thruster has a propellant manifold in communication with said monopropellant tank, said propellant manifold containing the supply of said liquid monopropellant so that when said electrical/chemical thruster is actuated, said liquid monopropellant is supplied to each inlet end such that liquid monopropellant flows through substantially all of said microthrusters at said first flowrate when operated in said chemical mode.

14. The electrical/chemical thruster as set forth in claim 1 wherein said first flowrate is sufficiently low to initiate decomposition of the monopropellant prior to exiting the end of the emitter, and wherein said first flow rate is sufficiently high to prevent the reaction front from propagating back into said supply of said liquid monopropellant.

15. The electrical/chemical thruster as set forth in claim 1 wherein said monopropellant flows through substantially all of said plurality of microthrusters at said second flowrate when operated in said electrospray mode.

16. A thruster for use in a spacecraft propulsion system that is operable in a chemical mode and in an electrospray mode and that utilizes a liquid monopropellant for operation in both the chemical mode the electrospray mode, said thruster having a plurality of microthrusters, each microthruster of said plurality of microthruster comprising a microtube having a bore therethrough and having an inlet end and an outlet end with said inlet end being in communication with a supply of said liquid monopropellant, each microtube comprising a catalytic metal that is capable of being heated to a preheat temperature sufficient to decompose said liquid monopropellant in each microtube as said liquid monopropellant flows therethrough at a first flowrate so as to generate relatively high thrust when operated in the chemical mode as compared to when operated in the electrospray mode, and wherein said thruster further includes an extractor downstream of the outlet end of each microtube, which, when said thruster is operated in the electrospray mode, is energized to produce an electric field such that as said liquid monopropellant flows through each microtube at a second flowrate less than said first flowrate so ions and droplets discharged from each microtube are accelerated so as to yield a relatively high specific impulse as compared to operation of each microtube in the chemical mode.

17. The thruster as set forth in claim 16 wherein said liquid monopropellant comprises a mixture of one or more nonvolatile fuels and an oxidizer, wherein at least one of said one or more nonvolatile fuels and the oxidizer is an ionic liquid.

18. The thruster as set forth in claim 17 wherein said liquid monopropellant comprises [Bmim][NO.sub.3] and hydroxyl ammonium nitrate (HAN).

19. The thruster as set forth in claim 17 wherein said liquid monopropellant comprises [Emim][EtSO.sub.4] and hydroxyl ammonium nitrate (HAN).

20. A multimode propulsion system for a spacecraft that may be operated in a chemical mode and in an electrospray mode using the same monopropellant, said multimode propulsion system having at least one thruster having a plurality of microthrusters, each microthruster of said plurality of microthrusters comprising a microtube of a suitable catalytic metal and having an inlet end and outlet end with a bore therethrough, with the bore having an internal diameter of 100 .mu.m, plus or minus 50%, said microtube having a length of 30 mm., plus or minus 50%, a monopropellant system for supplying said monopropellant from a monopropellant supply to each inlet end at a first flowrate for operation of said plurality of microthrusters in either said chemical mode or at a second flowrate for operation of said plurality of microthrusters in said electrospray mode, said first flowrate being greater than said second flowrate, means for heating each microtube when said at least one thruster is operated in said chemical mode to a temperature sufficient to initiate chemical decomposition of said monopropellant and where said first flowrate of said monopropellant through each microtube is sufficient to allow ignition of said monopropellant in each microtube but prevents propagation of the chemical decomposition of said monopropellant back through at least one microtube to said monopropellant supply, and for operation of said at least one thruster in the electrospray mode where, each microtube is energized to operate as an emitter, said thruster having an extractor proximate each outlet end that may be energized by an electric source when said at least one thruster is operated in said electrospray mode so as to accelerate ions discharged from each outlet end, where the flowrate of said monopropellant when said at least one thruster is operated in the electrospray mode significantly lower than the flowrate when said at least one thruster is operated in the chemical mode.

21. An electrical/chemical spacecraft propulsion method utilizing a liquid monopropellant comprising one or more fuels and an oxidizer for operation in both an electrospray mode and a chemical mode, said method comprising the steps of discharging said liquid monopropellant from a plurality of microtubes energized to be emitters in an electric field for generating a relatively high specific impulse as compared when said plurality microtubes are operated in said chemical mode, or preheating said plurality of microtubes and chemically reacting said monopropellant in said plurality of microtubes as said liquid monopropellant flows therethrough for generating relatively high thrust as compared when said plurality of microtubes are operated in said electrospray mode.

22. The electrical/chemical spacecraft propulsion method of claim 21 further comprising the steps of providing said plurality of said microtubes in a thruster, wherein each microtube of said plurality of microtubes has an inlet end and an outlet end.

23. The electrical/chemical spacecraft propulsion method of claim 22 further comprising the steps of supplying said liquid monopropellant to each the inlet end at a first flowrate for chemical operation of said thruster and at a second flowrate for electrospray operation of said thruster, where said first flow rate is 10.mu.L/sec/emitter, plus or minus 5 .mu.L/sec/[microtube], and where said second flowrate is 1 pL/sec/emitter, plus or minus 0.9 pL/sec/[microtube], and when operated in said chemical mode each emitter of said emitters has a specific impulse of 180 seconds, plus or minus 50% and a thrust of 50 .mu.N, plus or minus 50%, and when operated in the electrospray mode each emitter of said emitters has a specific impulse of 800 seconds, plus or minus 50%.

* * * * *